United States Patent
Lighty et al.

(10) Patent No.: US 12,553,382 B2
(45) Date of Patent: Feb. 17, 2026

(54) INTEGRATED BYPASS DUCT HEAT EXCHANGER

(71) Applicant: Rolls-Royce North American Technologies Inc., Indianapolis, IN (US)

(72) Inventors: Kerry J. Lighty, Plainfield, IN (US); Douglas J. Snyder, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/228,255

(22) Filed: Jul. 31, 2023

(65) Prior Publication Data

US 2025/0043723 A1   Feb. 6, 2025

(51) Int. Cl.
*F02C 7/12*    (2006.01)
*F02C 9/18*    (2006.01)

(52) U.S. Cl.
CPC .............. *F02C 7/12* (2013.01); *F02C 9/18* (2013.01); *F05D 2260/213* (2013.01); *F05D 2260/606* (2013.01)

(58) Field of Classification Search
CPC ......... F05D 2260/606; F05D 2260/213; F02C 7/12; F02C 9/18
See application file for complete search history.

(56) References Cited

U.S. PATENT DOCUMENTS

| | | |
|---|---|---|
| 3,528,250 A | 9/1970 | Johnson |
| 7,946,806 B2 | 5/2011 | Murphy |
| 8,020,298 B2 | 9/2011 | Campbell et al. |
| 8,157,503 B2 | 4/2012 | Junod |
| 8,171,986 B2 | 5/2012 | Klein |
| 8,490,382 B2 * | 7/2013 | Zysman ............... F02K 1/1207 60/226.3 |
| 8,910,465 B2 | 12/2014 | Snyder |
| 8,961,114 B2 | 2/2015 | Ruthemeyer |
| 9,212,623 B2 | 12/2015 | Murphy et al. |
| 9,243,563 B2 | 1/2016 | Lo |
| 9,267,390 B2 | 2/2016 | Lo |
| 9,587,561 B2 | 3/2017 | Snyder et al. |
| 10,323,540 B2 | 6/2019 | Sennoun |
| 10,450,956 B2 | 10/2019 | Schmitz |
| 10,677,166 B2 | 6/2020 | Pesyna et al. |
| 10,989,071 B2 | 4/2021 | Walsh et al. |
| 11,035,295 B2 | 6/2021 | McGee et al. |
| 11,459,949 B2 | 10/2022 | Modrzejewski |
| 2007/0295492 A1 | 12/2007 | Sharp et al. |
| 2008/0017360 A1 | 1/2008 | Campbell et al. |

(Continued)

*Primary Examiner* — Courtney D Heinle
*Assistant Examiner* — Andrew Thanh Bui
(74) *Attorney, Agent, or Firm* — Barnes & Thornburg LLP

(57) ABSTRACT

A gas turbine engine includes a bypass duct including an outer wall, a flow wall arranged within the bypass duct so as to bifurcate a flow path of the bypass duct into radially outer and inner flow paths, and a heat exchanger. The outer wall includes a segmented wall portion that is removable from the outer wall. The heat exchanger is arranged within the radially outer flow path and is coupled to the segmented wall portion such that the heat exchanger is configured to be removed from the bypass duct via removal of the segmented wall portion from the outer wall.

18 Claims, 5 Drawing Sheets

(56) References Cited

U.S. PATENT DOCUMENTS

| | | |
|---|---|---|
| 2019/0203613 A1 | 7/2019 | Sennoun |
| 2019/0323429 A1 | 10/2019 | McGee et al. |
| 2020/0271073 A1 | 8/2020 | Banham et al. |
| 2020/0332718 A1* | 10/2020 | Rambo .................... F02C 7/18 |
| 2021/0071581 A1 | 3/2021 | Sodaro et al. |
| 2022/0260018 A1 | 8/2022 | Sidorovich et al. |
| 2022/0282670 A1* | 9/2022 | Niergarth .............. F28D 1/0471 |
| 2022/0403780 A1 | 12/2022 | Price et al. |
| 2024/0384684 A1* | 11/2024 | Terwilliger ............... F02C 7/14 |

* cited by examiner

INTEGRATED BYPASS DUCT HEAT EXCHANGER

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat-exchanger assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a bypass duct. A fan included in the gas turbine engine forces air into the compressor of the engine and may also provide additional thrust via forcing air around the engine core through the bypass duct. The bypass duct may include components configured to transfer heat between cooling fluids and the air flowing through the bypass duct. Some bypass duct designs must be wholly disassembled and reassembled to reach components within the bypass duct which may be labor and time intensive.

SUMMARY

The present disclosure may comprise one or more of the following features and combinations thereof.

According to an aspect of the present disclosure, a gas turbine engine comprising a bypass duct, a flow wall, and a heat exchanger assembly. The bypass duct is arranged circumferentially around a central axis of the gas turbine engine. The bypass duct includes an outer wall that defines an outer boundary of a flow path and an inner wall that defines an inner boundary of the flow path. The bypass duct is configured to direct bypass air from an inlet of the gas turbine engine through the flow path. The flow wall is arranged within the bypass duct so as to bifurcate the flow path into a radially outer flow path and a radially inner flow path. A first portion of the bypass air flows into and through the radially outer flow path and a second portion of the bypass air flows into and through the radially inner flow path. The heat exchanger assembly is arranged within the radially outer flow path and coupled to the outer wall of the bypass duct. The heat exchanger assembly is configured to receive the first portion of the bypass air flowing through the radially outer flow path of the bypass duct and to transfer heat from a cooling fluid passing through the heat exchanger assembly to the first portion of the bypass air.

In some embodiments, a forward portion of the flow wall axially forward of the heat exchanger assembly is arranged a first radial distance away from the central axis so as to define an inlet passage of the radially outer flow path. An aft portion of the flow wall axially aft of the heat exchanger assembly is arranged a second radial distance away from the central axis so as to define an outlet passage of the radially outer flow path. The second radial distance is less than the first radial distance in some embodiments.

A forward flow volume of the inlet passage is less than an aft flow volume of the outlet passage in some embodiments. A first pressure of the first portion of the bypass air flowing through the outlet passage is greater than a second pressure of the second portion of the bypass air flowing through the radially inner flow path in some embodiments.

In some embodiments, the outer wall has a first radius along a segment of the outer wall aligned axially with the inlet passage and a second radius along a segment of the outer wall aligned axially with the outlet passage. The first radius is equal to the second radius.

In some embodiments, the flow wall includes a sloped portion between the forward portion and the aft portion. The flow wall curves at a transition from the forward portion to the sloped portion and curves at a transition from the sloped portion to the aft portion when viewed in a circumferentially-facing direction. The sloped portion and curves force at least some of the bypass air radially outwardly such that the first portion of the bypass air enters the radially outer flow path.

In some embodiments, the transition from the sloped portion to the aft portion is located axially forward of an axially aft end of the heat exchanger assembly. In some embodiments, the transition from the forward portion to the sloped portion is located at an axially forward end of the heat exchanger assembly.

In some embodiments, the flow wall is annular and extends entirely around the central axis of the gas turbine engine. In some embodiments, the gas turbine engine further includes a low pressure sink arranged axially downstream of the outlet passage of the radially outer flow path.

In some embodiments, the outer wall includes at least one segmented wall portion that is removable from a remainder portion of the outer wall. The heat exchanger assembly is coupled to the at least one segmented wall portion such that the heat exchanger assembly is configured to be removed from the bypass duct via removal of the at least one segmented wall portion from the remainder portion of the outer wall.

In some embodiments, the at least one segmented wall portion includes a base surface and a raised portion. The raised portion includes a top wall radially outwardly spaced apart from the base surface so as to define a cavity within the raised portion. In some embodiments, the heat exchanger assembly is arranged and coupled within the cavity of the raised portion.

In some embodiments, the outer wall further includes a main annular mounting ring that extends around the central axis of the gas turbine engine and a plurality of segmented wall portions including the at least one segmented wall portion. Each segmented wall portion of the plurality of segmented wall portions is removably coupled to the main annular mounting ring. In some embodiments, at least one segmented wall portion of the plurality of segmented wall portions is removably coupled to an adjacent segmented wall portion of the plurality of segmented wall portions.

In some embodiments, the at least one segmented wall portion includes a first fluid connector extending radially upwardly therefrom and configured to fluidically transport the cooling fluid to the heat exchanger assembly. The first fluid connector is accessible from an outside environment radially outside of the at least one segmented wall portion. In some embodiments, an axially forward end of the heat exchanger assembly is radially closer to the central axis than an axially aft end of the heat exchanger assembly.

According to another aspect of the disclosure, a gas turbine engine includes a bypass duct, a flow wall, and a heat exchanger assembly. The bypass duct is arranged circumferentially around a central axis of the gas turbine engine. The bypass duct includes an outer wall defining an outer boundary of a flow path and an inner wall defining an inner boundary of the flow path. The outer wall includes at least one segmented wall portion that is removable from the outer wall. The bypass duct is configured to direct bypass air from an inlet of the gas turbine engine through the flow path. The flow wall is arranged within the bypass duct so as to bifurcate the flow path into a radially outer flow path and a radially inner flow path. A first portion of the bypass air flows into and through the radially outer flow path. The heat exchanger assembly is arranged within the radially outer flow path. The heat exchanger assembly is configured to receive the first portion of the bypass air flowing through the radially outer flow path of the bypass duct and to transfer heat from a cooling fluid passing through the heat exchanger assembly to the first portion of the bypass air. The heat exchanger assembly is coupled to the at least one segmented wall portion such that the heat exchanger assembly is configured to be removed from the bypass duct via removal of the at least one segmented wall portion from the outer wall.

In some embodiments, the at least one segmented wall portion includes a base surface and a raised portion including a top wall radially outwardly spaced apart from the base surface so as to define a cavity within the raised portion. The heat exchanger assembly is arranged within the cavity of the raised portion.

In some embodiments, the outer wall further includes a main annular mounting ring that extends around the central axis of the gas turbine engine and a plurality of segmented wall portions including the at least one segmented wall portion. Each segmented wall portion of the plurality of segmented wall portions is removably coupled to the main annular mounting ring. In some embodiments, at least one segmented wall portion of the plurality of segmented wall portions is removably coupled to an adjacent segmented wall portion of the plurality of segmented wall portions.

In some embodiments, the at least one segmented wall portion includes a first fluid connector extending radially upwardly therefrom and configured to fluidically transport the cooling fluid to the heat exchanger assembly. The first fluid connector is accessible from an outside environment radially outside of the at least one segmented wall portion.

According to an aspect of the present disclosure, a method includes a number of steps. The method includes arranging a bypass duct circumferentially around a central axis of a gas turbine engine, the bypass duct including an outer wall defining an outer boundary of a flow path and an inner wall defining an inner boundary of the flow path, the outer wall including at least one segmented wall portion that is removable from the outer wall, directing bypass air from an inlet of the gas turbine engine through the flow path, arranging a flow wall within the bypass duct so as to bifurcate the flow path into a radially outer flow path and a radially inner flow path, wherein a first portion of the bypass air flows into and through the radially outer flow path, arranging a heat exchanger assembly within the radially outer flow path and coupling the heat exchanger assembly to the at least one segmented wall portion, the heat exchanger assembly configured to receive the first portion of the bypass air flowing through the radially outer flow path of the bypass duct and to transfer heat from a cooling fluid passing through the heat exchanger assembly to the first portion of the bypass air, and removing the heat exchanger assembly from the bypass duct via removal of the at least one segmented wall portion from the outer wall.

These and other features of the present disclosure will become more apparent from the following description of the illustrative embodiments.

DETAILED DESCRIPTION OF THE DRAWINGS

Figure 1:
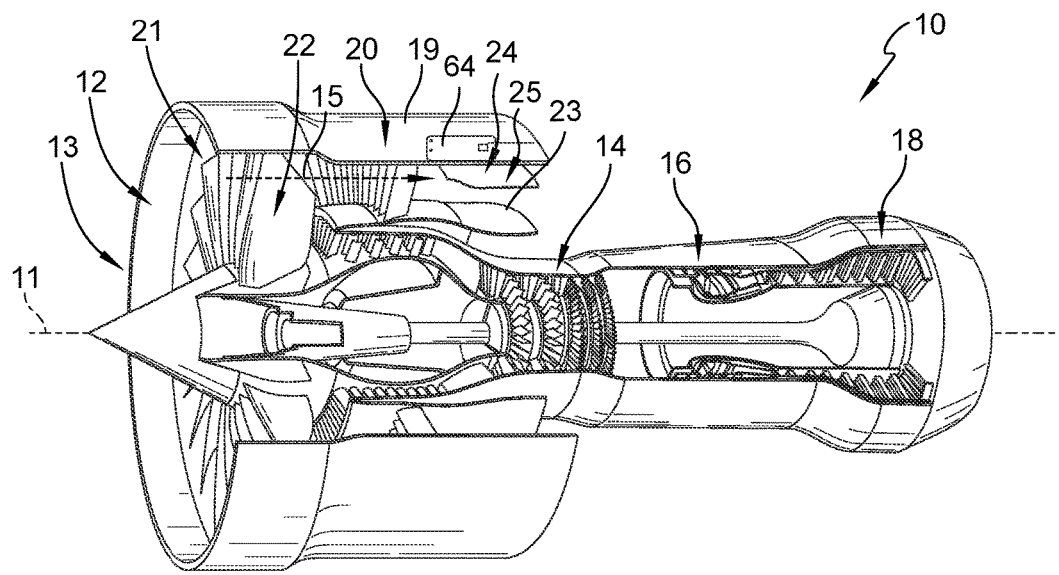
FIG. 1 is a cutaway view of a gas turbine engine that includes an inlet, a fan, a heat exchanger assembly arranged downstream of the inlet and within a bypass duct, a compressor, a combustor downstream of the compressor, and a turbine downstream of the combustor.

For the purposes of promoting an understanding of the principles of the disclosure, reference will now be made to a number of illustrative embodiments illustrated in the drawings and specific language will be used to describe the same.

Figure 6:
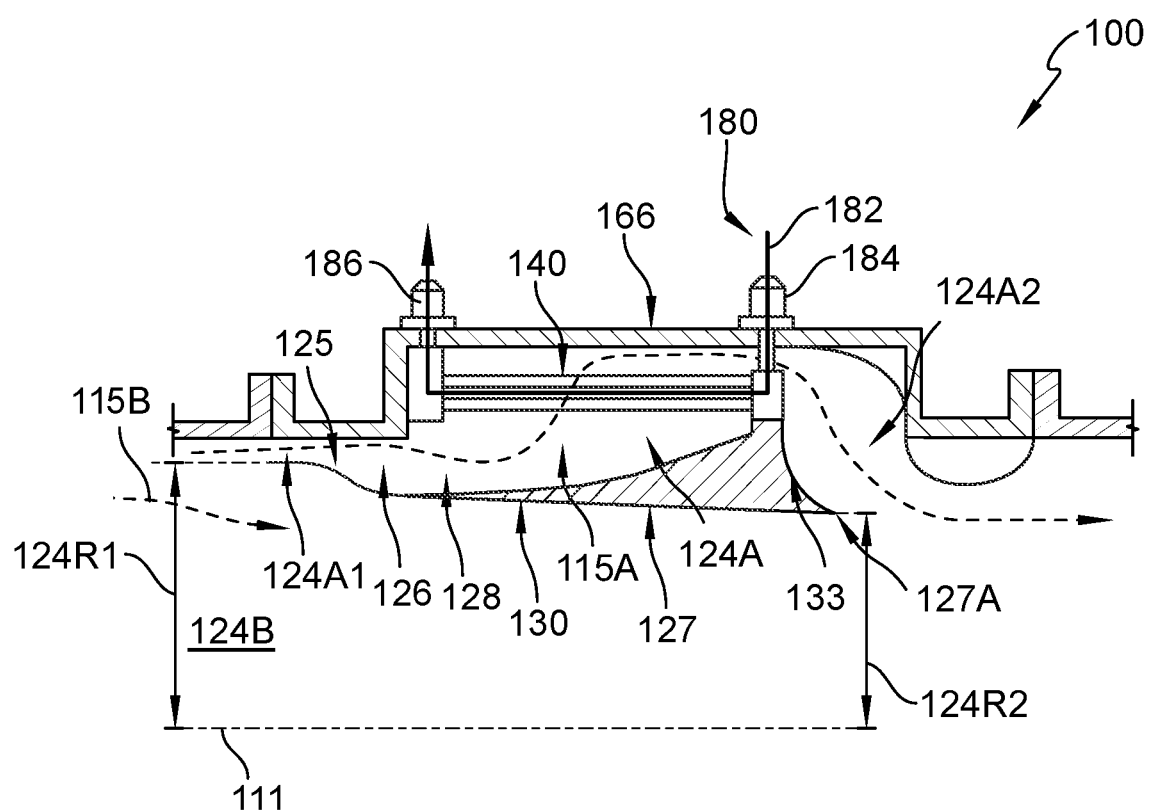
FIG. 6 is a side view of a portion of a bypass duct of a gas turbine according to a further aspect of the present disclosure, showing that a heat exchanger assembly is arranged within a radially outer flow path of the bypass duct defined by a flow wall arranged radially inwardly of an outer wall of the bypass duct, showing that the heat-exchanger assembly is removably coupled to a the outer wall, and showing that the flow wall terminates directly aft of the heat exchanger assembly such that air output from the heat exchanger assembly can mix with the main bypass air flow.
Figure 7:
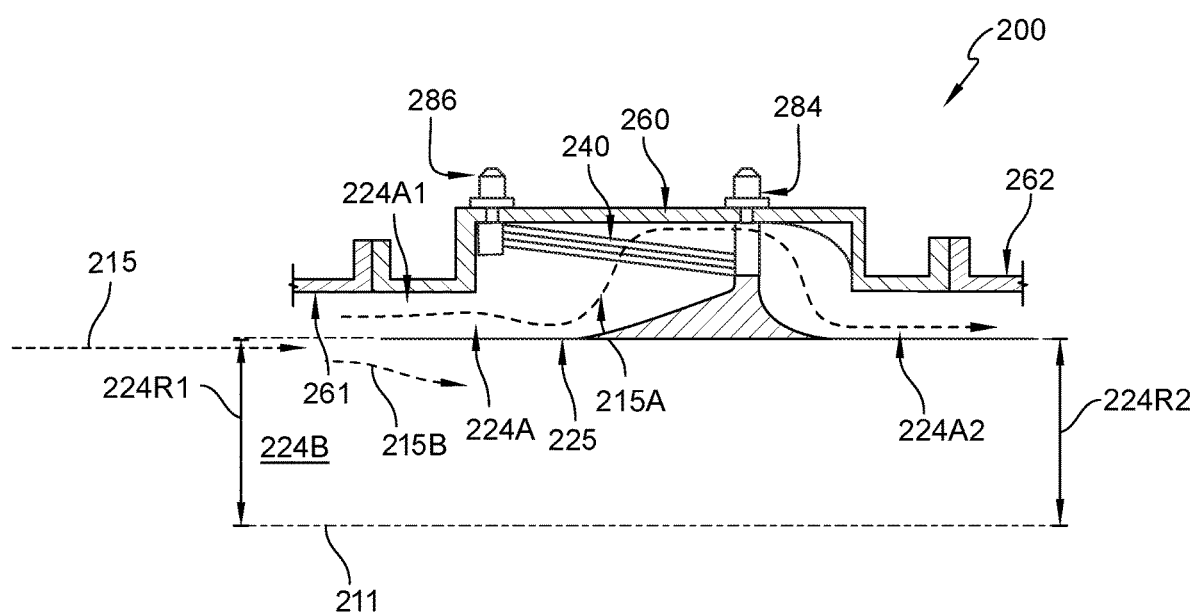
FIG. 7 is a side view of a portion of a bypass duct of a gas turbine according to a further aspect of the present disclosure, showing that a heat exchanger assembly is arranged within a radially outer flow path of the bypass duct defined by a flow wall arranged radially inwardly of an outer wall of the bypass duct, showing that the heat-exchanger assembly is removably coupled to a the outer wall, and showing that the flow wall is axially straight as viewed from the circumferentially-facing perspective of FIG. 7.

According to a first aspect of the present disclosure, a gas turbine engine 10 includes a bypass duct 20, a flow wall 25, and a heat exchanger assembly 40 coupled to a segmented wall portion 64 of an outer wall 19 of the bypass duct 20, as shown in FIGS. 1-5. The segmented wall portion 64 is removable from the remainder of the outer wall 19 such that the heat exchanger assembly 40 is removable from the bypass duct. A second aspect of a gas turbine engine 100 according to the present disclosure is shown in FIG. 6. A third aspect of a gas turbine engine 200 according to the present disclosure is shown in FIG. 7.

An illustrative aerospace gas turbine engine 10 includes a fan assembly 12 arranged in an inlet 13, a compressor 14, a combustor 16 located downstream of the compressor 14, and a turbine 18 located downstream of the combustor 16 as shown in FIG. 1. The fan assembly 12 is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 includes a fan 21 having a plurality of fan blades 22 that extend radially outward relative to the central axis 11 as shown in FIG. 1. The plurality of fan blades 22 rotate about the central axis 11 to force the air 15 through a flow path 24 such that the air 15 is directed through the bypass duct 20 to provide thrust to propel the gas turbine engine 10.

The bypass duct 20 is arranged circumferentially around the central axis 11 and includes an outer wall 19 and an inner wall 23 as shown in FIG. 1. The outer wall 19 defines a radially outer boundary of the flow path 24 of the bypass duct 20. The inner wall 23 defines a radially inner boundary of the flow path 24 of the bypass duct 20. The bypass duct 20 is configured to direct the air 15 through the flow path 24 to provide thrust to propel the gas turbine engine 10.

As shown in FIG. 1, the outer wall 19 is generally annular and extends around the central axis 11. In some embodiments, the outer wall 19 is segmented, partially segmented, or formed as a single annular ring that extends entirely circumferentially around the central axis 11. As will be described in greater detail below, the outer wall 19 may include a main annular mounting ring 60 and a plurality of segmented wall portions 64 removably coupled to the mounting ring 60 to which a heat exchanger assembly 40 is coupled (not shown in FIG. 1).

Figure 2:
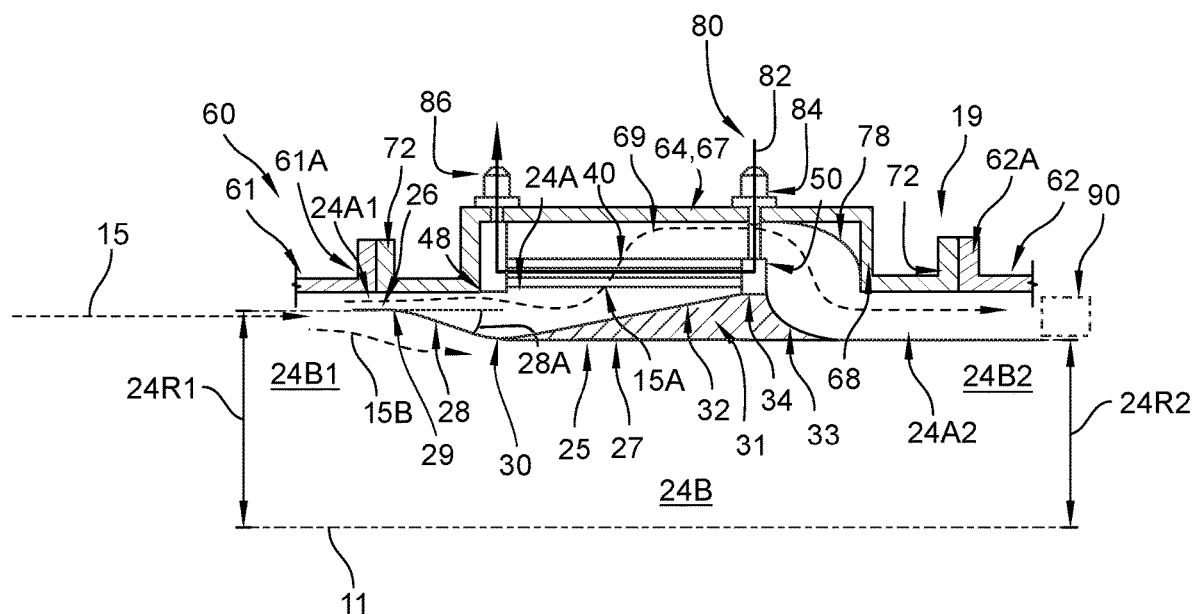
FIG. 2 is a side view of a portion of the bypass duct of the gas turbine engine of FIG. 1, showing that a heat exchanger assembly is arranged within a radially outer flow path of the bypass duct defined by a flow wall arranged radially inwardly of an outer wall of the bypass duct, and showing that the heat-exchanger assembly is removably coupled to a the outer wall.
Figure 3:
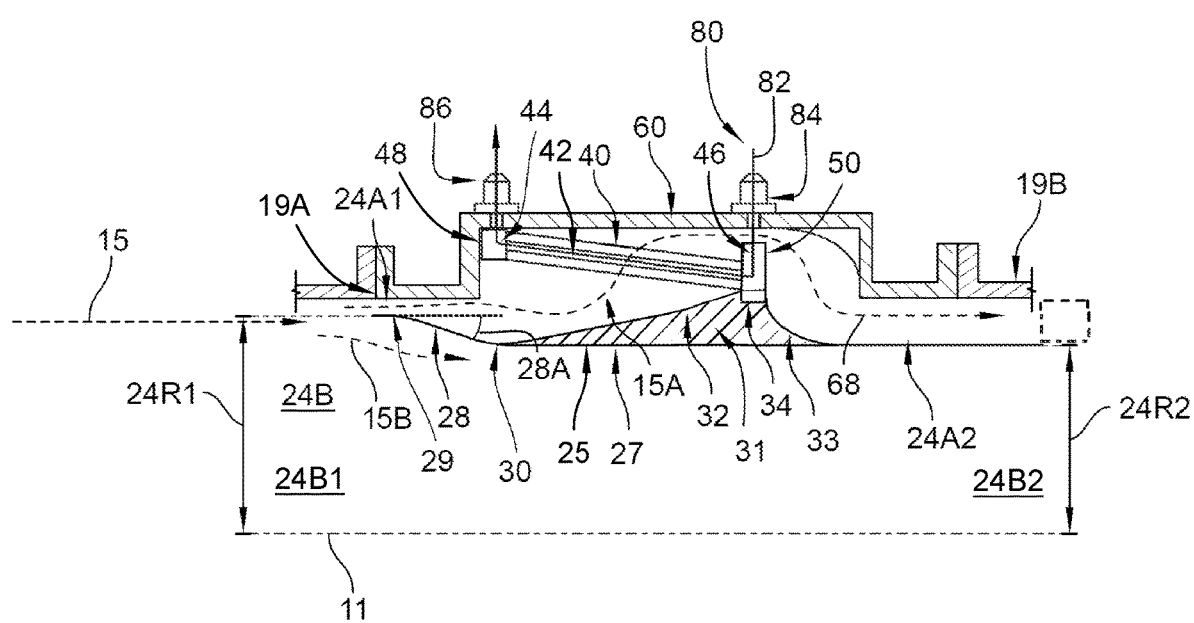
FIG. 3 is a side view of the portion of the bypass duct of the gas turbine engine of FIG. 2, showing that the heat exchanger assembly can be tilted.

The engine 10 may further include a flow wall 25 arranged within the bypass duct 20, in particular within the flow path 24, as shown in FIGS. 2 and 3. Illustratively, the flow wall 25 is annular and is arranged radially between the outer wall 19 and the inner wall 23 such that the flow wall 25 bifurcates the flow path 24 into a radially outer flow path 24A and a radially inner flow path 24B. As a result, a first portion 15A of the bypass air flows into and through the radially outer flow path 24A and a second portion 15B of the bypass air flows into and through the radially inner flow path 24B. In some embodiments, the flow wall 25 may be segmented, while in other embodiments, the flow wall 25 extends entirely circumferentially around the central axis 11.

Illustratively, the flow wall 25 may be include a sloped portion 28 axially between a forward portion 26 and an aft portion 27 of the flow wall 25, as shown in FIG. 2. Specifically, the flow wall 25 curves radially inwardly at a transition 29 from the forward portion 26 to the sloped portion 28, and then curves radially outwardly at a transition 30 from the sloped portion 28 to the aft portion 27 when viewed in a circumferentially-facing direction shown in FIG. 2. As will be described in greater detail below, the aft portion 27 can include a radial protrusion 31 that defines an upper surface 32 for further directing the first portion 15A of the bypass air 15 to the heat exchanger 42. In some embodiments, the two curved portions at the transitions 29, 30 may extend annularly around the entirety of the flow wall 25. A person skilled in the art will understand that, in alternative embodiments, the flow wall 25 may be generally axially straight and without a slope, as shown in FIG. 7.

As bypass air 15 is flowing through the portions of the bypass duct 20 directly upstream of the flow wall 25, the sloped portion 28 of the flow wall 25 will cause or force at least some of the bypass air 15 radially outwardly. As a result, the first portion 15A of the bypass air 15 will more readily enter the radially outer flow path 24A, while a main portion 15B of the bypass air 15, also referred to as a second portion 15B of the bypass air 15, will continue onto the radially inward flow path 24B, also referred to as the main bypass flow path 24B.

The radially inner flow path 24B is generally larger than the radially outer flow path 24A, as measured in the radial direction, and as such, more air will flow through the duct 20 as the second portion 15B of the bypass air 15 as opposed to the first portion 15A. Specifically, a forward portion 24B1 of the main bypass flow path 24B is larger than an aft portion 24B2 of the main bypass flow path 24B located axially aft of the forward portion 24B1. The forward portion 24B1 may be located axially between and defined by the forward portion 26 and the transition portion 30 of the flow wall 25, and the aft portion 24B2 may be located axially aligned with the aft portion 27 of the flow wall 25.

The sloped portion 28 may be sloped at a first angle 28A, as shown in FIG. 2, the angle 28A depending on the design requirements and projected airflow through the flow path 24. In some embodiments, the first angle 28A may be in a range of 6 degrees to 30 degrees, including all values therebetween. In some embodiments, the first angle 28A may be in a range of 8 degrees to 26 degrees, including all values therebetween. In some embodiments, the first angle 28A may be in a range of 10 degrees to 22 degrees, including all values therebetween. In some embodiments, the first angle 28A may be in a range of 12 degrees to 18 degrees, including all values therebetween. In some embodiments, the first angle 28A may be 14 degrees. Smaller angles may result in lower pressure losses, but a person skilled in the art will understand that this is to be balanced with the consideration that expansion should still occur over a reasonable distance.

Due to the sloped portion 28, the forward portion 26 of the flow wall 25 is arranged further radially outwardly than the aft portion 27 of the flow wall 25, as shown in FIG. 2. Specifically, the forward portion 26 of the flow wall 25 is arranged a first radial distance 24R1 away from the central axis 11 so as to define an inlet passage 24A1 of the radially outer flow path 24A. Similarly, the aft portion 27 of the flow wall 25 extends axially aft of the heat exchanger assembly 40, at which the aft portion 27 is arranged at a second radial distance 24R2 away from the central axis 11 so as to define an outlet passage 24A2 of the radially outer flow path 24A. The outer wall 19 includes a segment 19A aligned axially with the forward portion 26 and has a first radius and a segment 19B aligned axially with the outlet passage 24A2 of the aft portion 27 that has a second radius. In the illustrative embodiment, the first radius is equal to the second radius. In other embodiments, the second radius is greater than the first radius as shown in FIG. 6.

The second radial distance 24R2 is less than the first radial distance 24R1. As a result, the flow volume defined between the flow wall 25 and the outer wall 19 in the area of the inlet passage 24A1 is smaller than the flow volume defined between the flow wall 25 and the outer wall 19 in the area of the outlet passage 24A2. As such, the static pressure of the second portion 15B of the bypass air 15 is reduced in the location of the second radial distance 24R2 which increases the pressure difference of the first portion 15A of air from the inlet passage 24A1 to the outlet passage 24A2 causing more air to be urged into the heat exchanger 46 as first portion 15A of the air.

Thus, the flow wall 25 serves the purposes of pushing the first portion 15A of the bypass air 15 into the radially outer flow path 24A, keeping the first portion 15A of the bypass air 15 separate from the main, second portion 15B of bypass air 15, and lowers the pressure of the first portion 15A of the bypass air 15 as it passes through the heat exchanger assembly 40 and to the outlet passage 24A2. Furthermore, by making the second radial distance 24R2 smaller than the first radial distance 24R1, the static pressure can be further reduced in the aft portion 24B2 of the main bypass flow path 24B. This lowered static pressure will increase the pressure difference on first portion 15A of the bypass air 15 across the inlet passage 24A1 to the heat exchanger 42 and therefore cause more air to pass through the heat exchanger 42.

Moreover, as a result of the pressure of the first portion 15A of the bypass air 15 flowing through the outlet passage 24A2 being lower than the main, second portion 15B of the bypass air 15, the portion 15A of air 15 flowing out of the heat exchanger assembly 40 can be exhausted to a low pressure sink 90 axially downstream from or within the outlet passage 24A2, in particular a lower pressure sink 90 than a pressure sink that the main, second portion 15B of the bypass air 15 is directed to (not shown). In some embodiments, the first portion 15A never remixes with the main, second portion 15B. In some embodiments, the first portion 15A exits to ambient or to an engine bay just outside of the engine 10.

Illustratively, the forward portion 26 is arranged axially forward of the heat exchanger assembly 40. The aft portion 27 extends from the transition 30 and axially beyond the heat exchanger assembly 40. These features related to the positioning of the flow wall 25 components relative to the heat exchanger assembly 40 will be described in greater detail below.

In some embodiments, the flow wall 25 can include a radial protrusion 31 that extends radially outwardly away from the generally flat aft portion 27 of the wall 25, as shown in FIG. 2. The radial protrusion 31 can include a first upper surface 32 that is sloped and configured to direct the first portion 15A of the bypass air 15 into the heat exchanger assembly 40. The radial protrusion 31 can further include a second upper surface 33 axially aft of the first upper surface 32 and axially aft of an aft end 50 of the heat exchanger assembly 40. The second upper surface 33 can define the forwardmost portion of the outlet passage 24A2 that is downstream of the heat exchanger assembly 40 and directs the first portion 15A of bypass air 15 aft and away from the heat exchanger assembly 40. In some embodiments, the second upper surface 33 is curved similarly to a corresponding curved inner surface 78 arranged within the raised portion 66 of the segmented wall portion 64 so as define a smooth flow path in order to minimize pressure losses.

In some embodiments, the radial protrusion 31 can further include a landing 34 configured to support and couple to an aft heat exchanger support 46, as shown in FIGS. 2 and 3. In some embodiments, the landing 34 is the radially outermost surface of the radial protrusion 31, and can include an axial width that is equal to the axial width of the aft heat exchanger support 46, as shown in FIGS. 2 and 3. The top surface of the landing 34 may be parallel with the central axis 11 and support a bottom surface 52 of the aft heat exchanger support 46.

As shown in FIG. 2, the heat exchanger assembly 40 is removably coupled with the outer wall 19, and in some embodiments as will be described below, to a segmented wall portion 64 of the outer wall 19 such that the heat exchanger assembly 40 is removable from the bypass duct 20 via removal of the segmented wall portion 64. The heat exchanger assembly 40 is configured to receive the first portion 15A of the bypass air 15 flowing through inlet passage 24A1 of the radially outer flow path 24A and to transfer heat from a cooling fluid 82 of a cooling assembly 80 passing through the heat exchanger assembly 40 to the first portion 15A of the bypass air 15.

Illustratively, as shown in detail in FIG. 3, the heat exchanger assembly 40 includes a heat exchanger 42, a forward heat exchanger support 44, and the aft heat exchanger support 46. The forward heat exchanger support 44 defines an axially forward end 48 of the heat exchanger assembly 40, as shown in FIG. 3, which may be an axially forwardmost point of the heat exchanger assembly 40. Similarly, the aft heat exchanger support 46 defines an axially aft end 50 of the heat exchanger assembly 40, as shown in FIG. 3, which may be an axially aftmost point of the heat exchanger assembly 40.

In some embodiments, the transition 29 from the forward portion 26 to the sloped portion 28 is located axially forward of the axially forward end 48 of the heat exchanger assembly 40, as shown in FIGS. 2 and 3. In some embodiments, the transition 30 from the sloped portion 28 to the aft portion 27 is located axially aligned with an aft side of the forward heat exchanger support 44 of the heat exchanger assembly 40 and axially forward of the axially aft end 50 of the heat exchanger assembly 40, as also shown in FIGS. 2 and 3. The arrangement of the transitions 29, 30 in these locations may aid in pressure loss reduction at certain design points, although a person skilled in the art will understand that adjustment of the transitions 29, 30 in the axial direction may be necessary based on certain design requirements of the engine 10.

In some embodiments, the heat exchanger 42 may be oriented so as to be tilted, as shown in FIG. 3. Specifically, the axially forward end 48 of the heat exchanger assembly 40 is located further radially outwardly of the central axis 11 than the axially aft end 50 of the heat exchanger assembly 40. The tilt of the heat exchanger 42 of the heat exchanger assembly 40 may aid in turning the first portion 15A of the bypass air 15 into and through the heat exchanger 42, while also potentially reducing pressure losses and improving heat transfer. A person skilled in the art will understand that FIG. 3 only shows an exemplary arrangement of the heat exchanger 42 and its orientation, and that all arrangements and configurations shown in FIG. 3 are applicable to FIG. 2. A person skilled in the art will understand that the heat exchanger assembly 40 may also be arranged to be axially level (axially parallel with the central axis 11), as shown in FIG. 2, based on the design requirements and configurations of the gas turbine engine 10.

Figure 5:
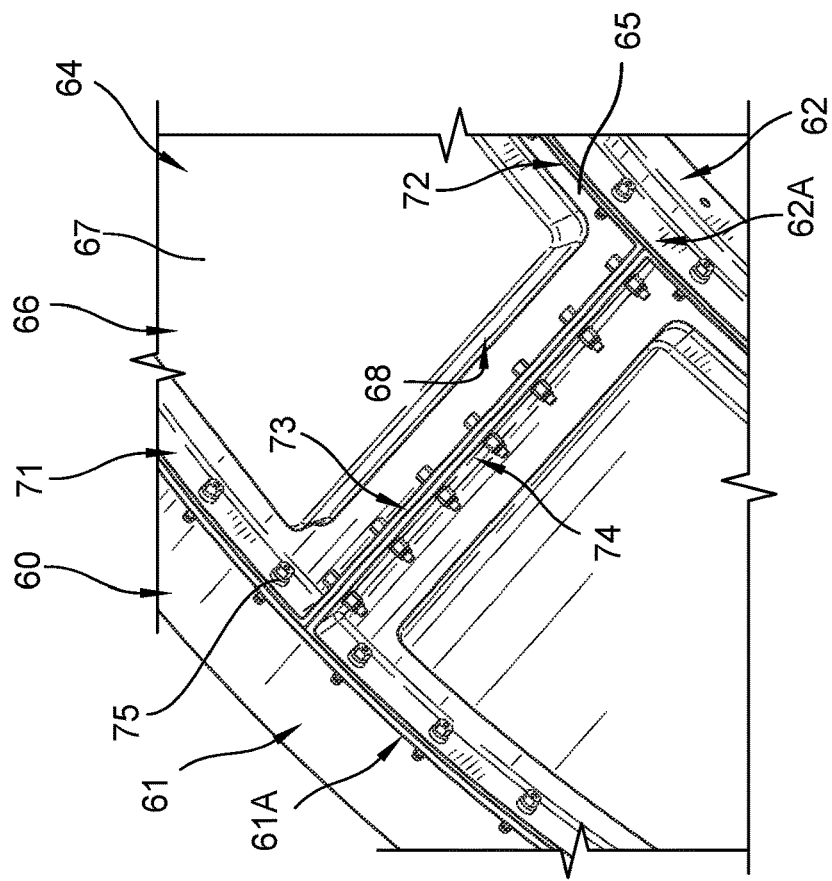
FIG. 5 is an enlarged perspective view of the outer wall of FIG. 4, showing that the segmented wall portions can be fastened to each other and to the main annular mounting ring via fasteners.
Figure 4:
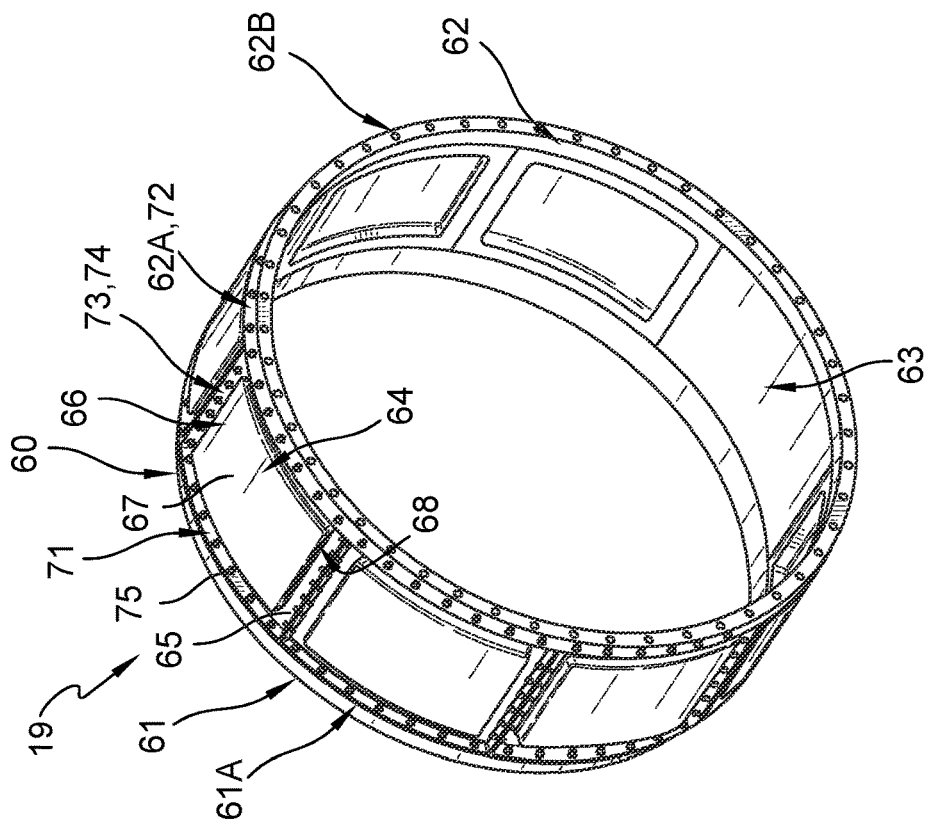
FIG. 4 is a perspective view of the outer wall of the bypass duct of the gas turbine engine of FIGS. 1-3, showing that the outer wall includes a plurality of segmented wall portions that are removable from a main annular mounting ring of the outer wall, and showing that the segmented wall portions can be fastened to each other and to the main annular mounting ring.

As touched on above, the outer wall 19 may include at least one segmented wall portion 64 that is removable from the outer wall 19, as shown in detail in FIGS. 4 and 5. The heat exchanger assembly 40 is coupled to the at least one segmented wall portion 64 such that the heat exchanger assembly 40 is configured to be removed from the bypass duct 20 via removal of the segmented wall portion 64 from the outer wall 19.

As shown in FIG. 4, the outer wall 19 includes a main annular mounting ring 60 that extends around the central axis 11 of the gas turbine engine 10. The main annular mounting ring 60 can include a first mount ring 61 that is concentric with and axially forward of and spaced apart from a second mount ring 62. The rings 61, 62 may be coupled to each other via a mount bridge 63 that extends axially between the rings 61, 62. Each ring may include a forward and aft mount flange 61A, 62A extending radially outwardly therefrom and arranged on a side of the ring 61, 62 that faces the opposing ring 61, 62. In other embodiments, the rings 61, 62 are not coupled to each other, but instead mounted within the gas turbine engine 10 via external mounting components of the engine 10 (not shown).

The separation of the two rings 61, 62 creates a space between the rings 61, 62 within which a plurality of segmented wall portions 64 may be arranged, as shown in FIG. 4. The segmented wall portions 64 may be arranged annularly around the main annular mounting ring 60 from a first side of the mount bridge 63, around the mounting ring 60, to a second side of the mount bridge 63. In some embodiments, the mount bridge 63 may not be included, and the segmented wall portions 64 may extend entirely around the mounting ring 60. In some embodiments, the mount bridge 63 may be formed to be circumferentially larger than is shown in FIG. 4, and thus only a single segmented wall portion 64 is arranged in the mounting ring 60. A person skilled in the art will understand that any number of segmented wall portions 64 may be included in the mounting ring 60 as permitted and/or desired by the design requirements and configurations of the gas turbine engine 10.

As shown in FIGS. 4 and 5, each segmented wall portion 64 may include a base surface 65 and portion that protrudes radially outwardly away from the base surface 65, also referred to as a raised portion 66. The raised portion 66 includes a top wall 67 radially outwardly spaced apart from the base surface 65 and a side wall 68 that extends around the outer perimeter of the top wall 67 and is coupled to the outer perimeter of the top wall 67 and the inner perimeter of the base surface 65. As such, a cavity 69 is defined within the wall 68 and the top wall 67, within which the heat exchanger assembly 40 is arranged, as shown in FIGS. 2 and 3. The raised portion 66 may include a curved inner surface 78 that extends from an inner side of the top wall 67 and the side wall 68. The curved inner surface 78 directs the first portion 15A of the bypass air 15 exiting the heat exchanger assembly 40 radially inwardly and toward the corresponding second upper surface 33 of the flow wall 25 so as to more effectively move the air through the outlet passage 24A2.

Illustratively, each segmented wall portion 64 may further include forward and aft flanges 71, 72 that extend from forward and aft sides of the base surface 65, as shown in FIGS. 2-4. The forward and aft flanges 71, 72 are configured to couple to corresponding mount flanges 61A, 62A of the main annular mounting ring 60. Similarly, each segmented wall portion 64 may further include circumferentially offset flanges 73, 74 that extend from circumferential sides of the base surface 65. The circumferentially offset flanges 73, 74 are configured to couple each segmented wall portion 64 to adjacent segmented wall portions 64, or to the bridge 63. In some embodiments, the segmented wall portion 64 may only include one of forward and aft flanges 71, 72 or circumferentially offset flanges 73, 74. In other words, in some embodiments, the segmented wall portions 64 may be mounted in the mounting ring 60 only via forward and aft flanges 71, 72, and in other embodiments, the segmented wall portions 64 may be mounted in the mounting ring 60 only via circumferentially offset flanges 73, 74.

The flanges 71, 72 may be fastened to the main annular mounting ring 60, and the circumferentially offset flanges 73, 74 may be fastened to each other, via fasteners 75, which may be bolts, screws, or any other fasteners known in the art. The interfaces between the flanges 71, 72 and the mount flanges 61A, 62A, and between circumferentially offset flanges 73, 74 may be sealed to prevent air leakage. The bolted segments also provide structural stiffness and strength.

As described above, the gas turbine engine 10 further includes a cooling assembly 80, as shown in FIGS. 2 and 3. The segmented wall portions 64 each further includes at least one fluid connector 84, 86, and in some embodiments two or more fluid connectors 84, 86, extending radially upwardly from the top wall 67. The fluid connectors 84, 86 are configured to fluidically transport the cooling fluid 82 to the heat exchanger 42 of the heat exchanger assembly 40, in particular along a path from the first connector 84 to the second connector 86. Each fluid connector 84, 86 is accessible from an outside environment radially outside of the segmented wall portion 64.

In operation, in particular during maintenance of the gas turbine engine 10, components within the bypass duct 20 may need to be accessed, removed, and/or replaced. Conventional bypass ducts may need to be wholly disassembled and reassembled to reach components within the bypass duct. The gas turbine engine 10 described above provides a removable heat exchanger assembly 40 and accessible fluid connectors 84, 86, thereby allowing the components located in the bypass duct 20, such as the heat exchanger 42, to be accessed, removed, and/or replaced without dissembling the entire bypass duct 20. The segmented wall portion 64 can be removed from the outer wall 19, in particular from the main annular mounting ring 60, thus allowing for the removal of the heat exchanger 42.

The segmented wall design presents many advantages. As a non-limiting example, fabrication techniques for a microtube heat exchanger 42 produces a rectangular cross section core, and thus segmenting the outer wall 19 via the segmented wall portions 64 provides for an improved use of space due to radial versus planar mismatch. Secondly, the segmented wall portions 64 allow for the heat exchanger 42 to be easily removed when mounted in an engine 10 on a wing of an aircraft. As a further non-limiting example, the fluid connectors 84, 86 being readily accessible at the top wall 67 of each segmented wall portion 64 provides flexibility in what type of fluid is connected to the heat exchanger 42. For example, the aircraft may have a need to cool more than one type of fluid, and thus selective connections can be easily established at the readily accessible fluid connectors 84, 86.

A method according to the present disclosure includes arranging a bypass duct 20 circumferentially around a central axis 11 of a gas turbine engine 10, the bypass duct 20 including an outer wall 19 defining an outer boundary of a flow path 24 and an inner wall 23 defining an inner boundary of the flow path 24. The outer wall 19 includes at least one segmented wall portion 64 that is removable from the outer wall 19. The method can further include directing bypass air 15 from an inlet 13 of the gas turbine engine 10 through the flow path 24.

The method can further include arranging a flow wall 25 within the bypass duct 20 so as to bifurcate the flow path 24 into a radially outer flow path 24A and a radially inner flow path 24B. A first portion 15A of the bypass air 15 flows into and through the radially outer flow path 24A. The method can further include arranging a heat exchanger assembly 40 within the radially outer flow path 24A and coupling the heat exchanger assembly 40 to the at least one segmented wall portion 64, the heat exchanger assembly 40 configured to receive the first portion 15A of the bypass air 15 flowing through the radially outer flow path 24A of the bypass duct 20 and to transfer heat from a cooling fluid 82 passing through the heat exchanger assembly 40 to the first portion 15A of the bypass air 15. The method can further include removing the heat exchanger assembly 40 from the bypass duct 20 via removal of the at least one segmented wall portion 64 from the outer wall 19.

Another embodiment of a gas turbine engine 100 is shown in FIG. 6. The gas turbine engine 100 is similar to the gas turbine engine 10 shown in FIGS. 1-5, and described herein. Accordingly, similar reference numbers in the 100 series indicate features that are common between the gas turbine engine 100 and the gas turbine engine 10. The description of the gas turbine engine 10 is incorporated by reference to apply to the gas turbine engine 100, except in instances when it conflicts with the specific description and the drawings of the gas turbine engine 100.

Similar to the gas turbine engine 10 described above, the gas turbine engine 100 includes a bypass duct 120 that is bifurcated by a flow wall 125 into a radially outer flow path 124A and a radially inner flow path 124B and a heat exchanger assembly 140 arranged in the radially outer flow path 124A. The gas turbine engine 100 differs from the gas turbine engine 10 of FIGS. 1-5 in that the aft portion 127 of the flow wall 125 terminates at an aft terminal end 127A that is located further axially forward than a terminal end of the aft portion 27 (not shown in FIGS. 2 and 3, but extending beyond the views shown in FIGS. 2 and 3). In some embodiments, the terminal end 127A is located at the aft end of the curvature of the second upper surface 133 of the flow wall 125. Due to the terminal end 127A being located in this position, the first portion 115A of the bypass air 115 that exits the heat exchanger assembly 140 and flows into the outlet passage 124A2 will immediately remix with the main, second portion 115B of the bypass air 115 flowing through the radially inner flow path 124B. The combined flow may then flow axially aft and toward a downstream exhaust mixer (not shown).

Another embodiment of a gas turbine engine 200 is shown in FIG. 7. The gas turbine engine 200 is similar to the gas turbine engines 10, 100 shown in FIGS. 1-6, and described herein. Accordingly, similar reference numbers in the 200 series indicate features that are common between the gas turbine engine 200 and the gas turbine engines 10, 100. The descriptions of the gas turbine engines 10, 100 are incorporated by reference to apply to the gas turbine engine 200, except in instances when they conflict with the specific description and the drawings of the gas turbine engine 200.

Similar to the gas turbine engines 10, 100 described above, the gas turbine engine 200 includes a bypass duct 220 that is bifurcated by a flow wall 225 into a radially outer flow path 224A and a radially inner flow path 224B and a heat exchanger assembly 240 arranged in the radially outer flow path 224A. The gas turbine engine 200 differs from the gas turbine engines 10, 100 of FIGS. 1-6 in that the flow wall 225 is axially straight as viewed from the circumferentially-facing perspective of FIG. 7. In other words, the flow wall 225 is parallel with the central axis 11. As such, the bypass air 215 will be bifurcated and split by the flow wall 225 at a radial position closer to the central axis 11 than the split point of the flow walls 25, 125 of the embodiments described above. In particular, the first and second radial distances 224R1, 224R2 may be equal, and in some embodiments, the first radial distance 224R1 is smaller than the radial distances 24R1, 124R1 described above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a bypass duct arranged circumferentially around a central axis of the gas turbine engine, the bypass duct including an outer wall defining an outer boundary of a flow path and an inner wall defining an inner boundary of the flow path, the bypass duct configured to direct bypass air from an inlet of the gas turbine engine through the flow path,
a flow wall arranged within the bypass duct so as to bifurcate the flow path into a radially outer flow path and a radially inner flow path, wherein a first portion of the bypass air flows into and through the radially outer flow path and a second portion of the bypass air flows into and through the radially inner flow path, and
a heat exchanger assembly arranged within the radially outer flow path and coupled to the outer wall of the bypass duct, the heat exchanger assembly configured to receive the first portion of the bypass air flowing through the radially outer flow path of the bypass duct and to transfer heat from a cooling fluid passing through the heat exchanger assembly to the first portion of the bypass air,
wherein a forward portion of the flow wall axially forward of the heat exchanger assembly is arranged a first radial distance away from the central axis so as to define an inlet passage of the radially outer flow path and an aft portion of the flow wall axially aft of the heat exchanger assembly is arranged a second radial distance away from the central axis so as to define an outlet passage of the radially outer flow path, and wherein the second radial distance is less than the first radial distance such that a first pressure of the first portion of the bypass air flowing through the outlet passage is greater than a second pressure of the second portion of the bypass air flowing through the radially inner flow path,
wherein the flow wall includes a sloped portion between the forward portion and the aft portion, wherein the flow wall curves at a transition from the forward portion to the sloped portion and curves at a transition from the sloped portion to the aft portion when viewed in a circumferentially-facing direction, and wherein the sloped portion and curves force at least some of the bypass air radially outwardly such that the first portion of the bypass air enters the radially outer flow path,
wherein the transition from the sloped portion to the aft portion is located axially forward of an axially aft end of the heat exchanger assembly, and wherein the transition from the aft portion to the sloped portion is located at an axially forward end of the heat exchanger assembly.

2. The gas turbine engine of claim 1, wherein the outer wall has a first radius along a segment of the outer wall aligned axially with the inlet passage and a second radius along a segment of the outer wall aligned axially with the outlet passage and the first radius is equal to the second radius.

3. The gas turbine engine of claim 1, further comprising:
a low pressure sink arranged axially downstream of the outlet passage of the radially outer flow path.

4. The gas turbine engine of claim 1, wherein the outer wall includes at least one segmented wall portion that is removable from a remainder portion of the outer wall, and wherein the heat exchanger assembly is coupled to the at least one segmented wall portion such that the heat exchanger assembly is configured to be removed from the bypass duct via removal of the at least one segmented wall portion from the remainder portion of the outer wall.

5. The gas turbine engine of claim 4, wherein the at least one segmented wall portion includes a base surface and a raised portion including a top wall radially outwardly spaced apart from the base surface so as to define a cavity within the raised portion.

6. The gas turbine engine of claim 5, wherein the heat exchanger assembly is arranged and coupled within the cavity of the raised portion.

7. The gas turbine engine of claim 4, wherein the outer wall further includes a main annular mounting ring that extends around the central axis of the gas turbine engine and a plurality of segmented wall portions including the at least one segmented wall portion, wherein each segmented wall portion of the plurality of segmented wall portions is removably coupled to the main annular mounting ring.

8. The gas turbine engine of claim 7, wherein at least one segmented wall portion of the plurality of segmented wall portions is removably coupled to an adjacent segmented wall portion of the plurality of segmented wall portions.

9. The gas turbine engine of claim 4, wherein the at least one segmented wall portion includes a first fluid connector extending radially upwardly therefrom and configured to fluidically transport the cooling fluid to the heat exchanger assembly, and wherein the first fluid connector is accessible from an outside environment radially outside of the at least one segmented wall portion.

10. The gas turbine engine of claim 1, wherein an axially forward end of the heat exchanger assembly is radially closer to the central axis than an axially aft end of the heat exchanger assembly.

11. A method comprising
arranging a bypass duct circumferentially around a central axis of a gas turbine engine, the bypass duct including an outer wall defining an outer boundary of a flow path and an inner wall defining an inner boundary of the flow path, the outer wall including at least one segmented wall portion that is removable from the outer wall,
directing bypass air from an inlet of the gas turbine engine through the flow path,
arranging a flow wall within the bypass duct so as to bifurcate the flow path into a radially outer flow path and a radially inner flow path, wherein a first portion of the bypass air flows into and through the radially outer flow path and a second portion of the bypass air flows into and through the radially inner flow path,
arranging a heat exchanger assembly within the radially outer flow path and coupling the heat exchanger assembly to the at least one segmented wall portion, the heat exchanger assembly configured to receive the first portion of the bypass air flowing through the radially outer flow path of the bypass duct and to transfer heat from a cooling fluid passing through the heat exchanger assembly to the first portion of the bypass air, and
removing the heat exchanger assembly from the bypass duct via removal of the at least one segmented wall portion from the outer wall,
wherein a forward portion of the flow wall axially forward of the heat exchanger assembly is arranged a first radial distance away from the central axis so as to define an inlet passage of the radially outer flow path and an aft portion of the flow wall axially aft of the heat exchanger assembly is arranged a second radial distance away from the central axis so as to define an outlet passage of the radially outer flow path, and wherein the second radial distance is less than the first radial distance such that a first pressure of the first portion of the bypass air flowing through the outlet passage is greater than a second pressure of the second portion of the bypass air flowing through the radially inner flow path.

12. The gas turbine engine of claim 1, wherein the flow wall further includes a radial protrusion extending radially outwardly, and wherein the heat exchanger is arranged on the radial protrusion.

13. A gas turbine engine comprising
a bypass duct arranged circumferentially around a central axis of the gas turbine engine, the bypass duct including an outer wall defining an outer boundary of a flow path and an inner wall defining an inner boundary of the flow path, the bypass duct configured to direct bypass air from an inlet of the gas turbine engine through the flow path,
a flow wall arranged within the bypass duct so as to bifurcate the flow path into a radially outer flow path and a radially inner flow path, wherein a first portion of the bypass air flows into and through the radially outer flow path and a second portion of the bypass air flows into and through the radially inner flow path, and
a heat exchanger assembly arranged within the radially outer flow path and coupled to the outer wall of the bypass duct, the heat exchanger assembly configured to receive the first portion of the bypass air flowing through the radially outer flow path of the bypass duct and to transfer heat from a cooling fluid passing through the heat exchanger assembly to the first portion of the bypass air,
wherein a forward portion of the flow wall axially forward of the heat exchanger assembly is arranged a first radial distance away from the central axis so as to define an inlet passage of the radially outer flow path and an aft portion of the flow wall axially aft of the heat exchanger assembly is arranged a second radial distance away from the central axis so as to define an outlet passage of the radially outer flow path, and wherein the second radial distance is less than the first radial distance such that a first pressure of the first portion of the bypass air flowing through the outlet passage is greater than a second pressure of the second portion of the bypass air flowing through the radially inner flow path, and
wherein the outer wall includes at least one segmented wall portion that is removable from a remainder portion of the outer wall, and wherein the heat exchanger assembly is coupled to the at least one segmented wall portion such that the heat exchanger assembly is configured to be removed from the bypass duct via removal of the at least one segmented wall portion from the remainder portion of the outer wall.

14. The gas turbine engine of claim 13, wherein the at least one segmented wall portion includes a base surface and a raised portion including a top wall radially outwardly spaced apart from the base surface so as to define a cavity within the raised portion.

15. The gas turbine engine of claim 14, wherein the heat exchanger assembly is arranged and coupled within the cavity of the raised portion.

16. The gas turbine engine of claim 13, wherein the outer wall further includes a main annular mounting ring that extends around the central axis of the gas turbine engine and a plurality of segmented wall portions including the at least one segmented wall portion, wherein each segmented wall portion of the plurality of segmented wall portions is removably coupled to the main annular mounting ring.

17. The gas turbine engine of claim 16, wherein at least one segmented wall portion of the plurality of segmented wall portions is removably coupled to an adjacent segmented wall portion of the plurality of segmented wall portions.

18. The gas turbine engine of claim 13, wherein the at least one segmented wall portion includes a first fluid connector extending radially upwardly therefrom and configured to fluidically transport the cooling fluid to the heat exchanger assembly, and wherein the first fluid connector is accessible from an outside environment radially outside of the at least one segmented wall portion.

* * * * *